(12) United States Patent
Honermann et al.

(10) Patent No.: US 8,777,125 B2
(45) Date of Patent: Jul. 15, 2014

(54) DEPLOYABLE OPERATOR INTERFACE FOR AN AGRICULTURAL VEHICLE

(75) Inventors: John Paul Honermann, Benson, MN (US); Scott David Reese, New London, MN (US)

(73) Assignee: CNH Industrial America LLC, New Holland, PA (US)

( * ) Notice: Subject to any disclaimer, the term of this patent is extended or adjusted under 35 U.S.C. 154(b) by 587 days.

(21) Appl. No.: 13/097,355

(22) Filed: Apr. 29, 2011

(65) Prior Publication Data

US 2012/0273063 A1     Nov. 1, 2012

(51) Int. Cl.
    *B05B 1/20*     (2006.01)
(52) U.S. Cl.
    USPC ........... 239/159; 239/164; 239/166; 239/169; 239/172; 239/569; 137/343; 137/615; 137/899
(58) Field of Classification Search
    USPC ......... 239/159, 161, 164, 166–169, 172, 569, 239/600; 137/342, 343, 615, 899; 141/387; 280/830, 838, 839
    See application file for complete search history.

(56) References Cited

U.S. PATENT DOCUMENTS

| | | | |
|---|---|---|---|
| 2,106,206 A | | 1/1938 | Crossen, Jr. et al. |
| 2,596,473 A | * | 5/1952 | Essick ........................... 239/172 |
| 4,944,258 A | | 7/1990 | Knutson et al. |
| 4,981,272 A | | 1/1991 | Cutore |
| 5,042,515 A | | 8/1991 | Boczkiewicz |
| 5,330,070 A | | 7/1994 | Gerhard et al. |
| 6,000,428 A | * | 12/1999 | Berberat ........................ 137/615 |
| 6,543,484 B1 | | 4/2003 | Highsmith |
| 6,863,086 B2 | | 3/2005 | Heiberger |
| 7,350,537 B2 | * | 4/2008 | Honermann .................. 137/343 |
| 2006/0076768 A1 | | 4/2006 | Kuntz |

OTHER PUBLICATIONS http://www.hagie.com/pdf/Hagie_2011_STX10_lit.pdf.

* cited by examiner

*Primary Examiner* — Steven J Ganey
(74) *Attorney, Agent, or Firm* — Rebecca L. Henkel

(57) ABSTRACT

An operator interface assembly is provided that includes a frame having a first end configured to rotatably couple to a first lateral frame tube of an agricultural vehicle, and a second end configured to transition between a raised position adjacent to a second lateral frame tube of the agricultural vehicle and a lowered position beneath the second lateral frame tube via rotation of the frame about the first end. The operator interface assembly also includes a fluid inlet coupled to the frame, and configured to provide fluid to the agricultural vehicle. In addition, the operator interface assembly includes a valve coupled to the frame, and configured to control fluid flow from the fluid inlet to the agricultural vehicle. The fluid inlet and the valve are positioned adjacent to the second end of the frame, and directed laterally outward with respect to the agricultural vehicle.

20 Claims, 5 Drawing Sheets

DEPLOYABLE OPERATOR INTERFACE FOR AN AGRICULTURAL VEHICLE

BACKGROUND

The invention relates generally to agricultural equipment, and more specifically, to a deployable operator interface for an agricultural vehicle.

Various types of agricultural vehicles (e.g., sprayers, floaters, applicators, etc.) are employed to deliver fertilizer, pesticides, herbicides, or other products to the surface of a field. Such agricultural vehicles typically include a boom configured to facilitate product delivery over wide swaths of soil. In certain configurations, the boom is suspended from a rear frame of the vehicle, and extends laterally outward from a center section. In such configurations, the center section is supported by a mast that is coupled to the agricultural vehicle by a linkage assembly. The boom includes multiple spray nozzles distributed across the length of the boom to deliver product from a tank to the surface of the field. Prior to operation, the tank may be filled with product via a fluid inlet on an operator interface. For example, an operator may couple a supply line to the fluid inlet, open a valve on the operator interface to establish a flow path between the fluid inlet and the tank, and then initiate product flow through the supply line. In certain configurations, the operator interface also includes various other fluid inlets (e.g., fresh water inlet, dry product inlet, etc.) and/or additional valves (e.g., water recirculation valve, etc.).

The operator interface is typically positioned beneath the vehicle chassis to facilitate access by an operator. However, certain agricultural vehicles are configured to provide high ground clearance to facilitate operation during later stages of crop development. Such vehicles generally include a chassis positioned a sufficient distance about the soil surface to clear the crops. Consequently, if the operator interface is positioned beneath the chassis of a high-clearance vehicle, access to the operator interface may be reduced (e.g., the operator interface may be positioned above the head of the operator). Unfortunately, if the operator interface is suspended a significant distance below the chassis, the interface may contact the crops as the vehicle traverses the field.

BRIEF DESCRIPTION

The present invention provides an operator interface assembly including a frame having a first end configured to rotatably couple to a first lateral frame tube of an agricultural vehicle, and a second end configured to transition between a raised position adjacent to a second lateral frame tube of the agricultural vehicle and a lowered position beneath the second lateral frame tube via rotation of the frame about the first end. The operator interface assembly also includes a fluid inlet coupled to the frame, and configured to provide fluid to the agricultural vehicle. In addition, the operator interface assembly includes a valve coupled to the frame, and configured to control fluid flow from the fluid inlet to the agricultural vehicle. The fluid inlet and the valve are positioned adjacent to the second end of the frame, and directed laterally outward with respect to the agricultural vehicle. In this configuration, the fluid inlet and the valve are positioned between the frame tubes while the second end is in the raised position, thereby providing a desired degree of ground clearance. However, when the second end is transitioned to the lowered position, the height of the fluid inlet and the valve are significantly reduced, thereby facilitating operator access.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
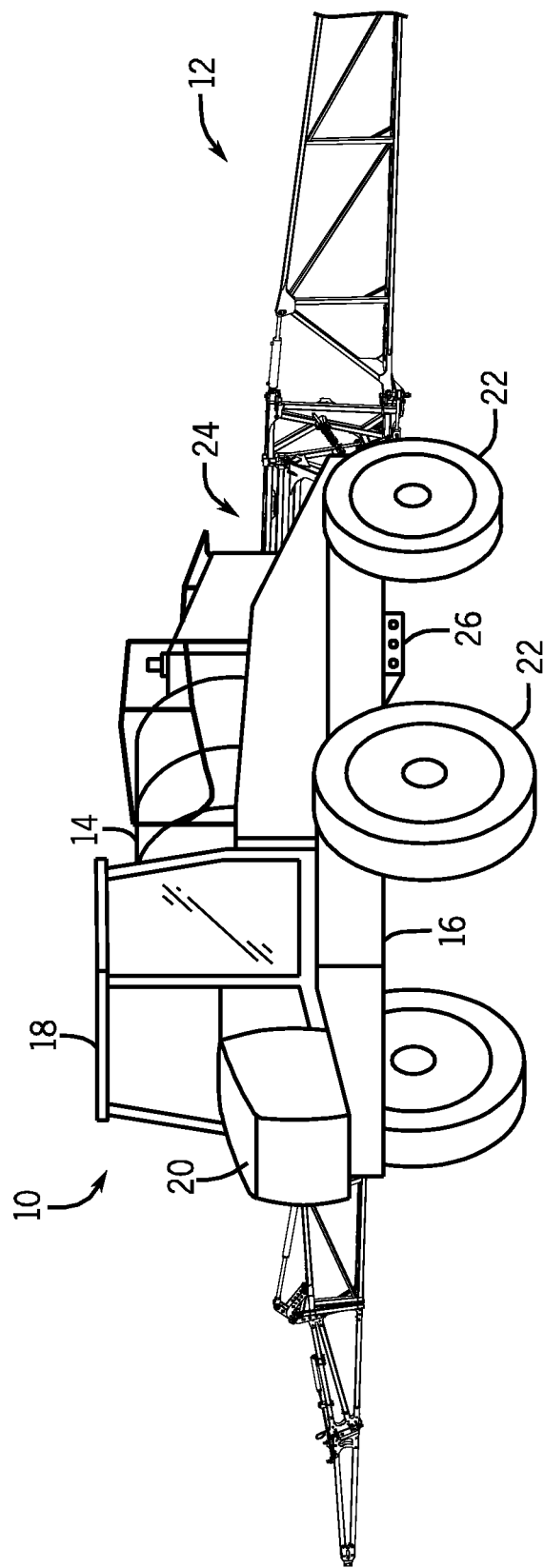
FIG. 1 is a perspective view of an embodiment of an agricultural vehicle that may include a deployable operator interface assembly.

FIG. 1 is a perspective view of an embodiment of an agricultural vehicle 10 that may include a deployable operator interface assembly. In the illustrated embodiment, the agricultural vehicle 10 includes a boom assembly 12 extending laterally outward from the vehicle 10, and configured to facilitate product deliver over wide swaths of soil. The vehicle 10 also includes a tank 14 where materials, such as fertilizer, pesticide, herbicide, and/or other products, are stored for distribution to a field. Furthermore, the agricultural vehicle 10 includes a chassis 16, a cab 18, and a hood 20. The chassis 16 provides structural support for the cab 18, the hood 20, and the tank 14. Furthermore, the cab 18 provides an enclosed space for an operator, and the hood 20 houses the engine and/or systems configured to facilitate operation of the vehicle 10. The agricultural vehicle 10 also includes wheels 22 configured to support the chassis 16, and to facilitate movement of the vehicle across the field.

The boom assembly 12 includes a mast 24 that supports the weight of the boom, and facilitates rotation of the boom relative to the vehicle 10. The mast 24, in turn, is coupled to the agricultural vehicle 10 by a linkage assembly (e.g., parallel linkage, four-bar linkage, etc.) that facilitates height adjustment of the boom relative to the soil surface. When distributing product, the boom extends laterally outward from the agricultural vehicle 10 to cover wide swaths of soil, as illustrated. However, to facilitate transport, each lateral wing of the boom assembly 12 may be folded forwardly into a transport position, thereby reducing the overall width of the vehicle.

In certain configurations, the boom assembly 12 includes multiple spray nozzles distributed across the length of the boom to deliver product from the tank 14 to the surface of a field. Prior to operation, the tank 14 may be filled with product via a fluid inlet on an operator interface assembly 26. For example, an operator may couple a supply line to the fluid inlet, open a valve on the operator interface assembly 26 to establish a flow path between the fluid inlet and the tank 14, and then initiate product flow through the supply line. In certain embodiments, the operator interface assembly 26 includes a frame having a first end configured to rotatably couple to a first lateral frame tube of the agricultural vehicle 10. The frame also includes a second end configured to transition between a raised position adjacent to a second lateral frame tube of the agricultural vehicle 10 and a lowered position beneath the second lateral frame tube via rotation of the frame about the first end. In addition, the operator interface assembly 26 includes a fluid inlet and a valve positioned adjacent to the second end of the frame. In this configuration, the fluid inlet and the valve are positioned between the frame tubes while the second end is in the raised position, thereby providing a desired degree of ground clearance. However, when the second end is transitioned to the lowered position, the height of the fluid inlet and the valve are significantly reduced, thereby facilitating operator access.

Figure 2:
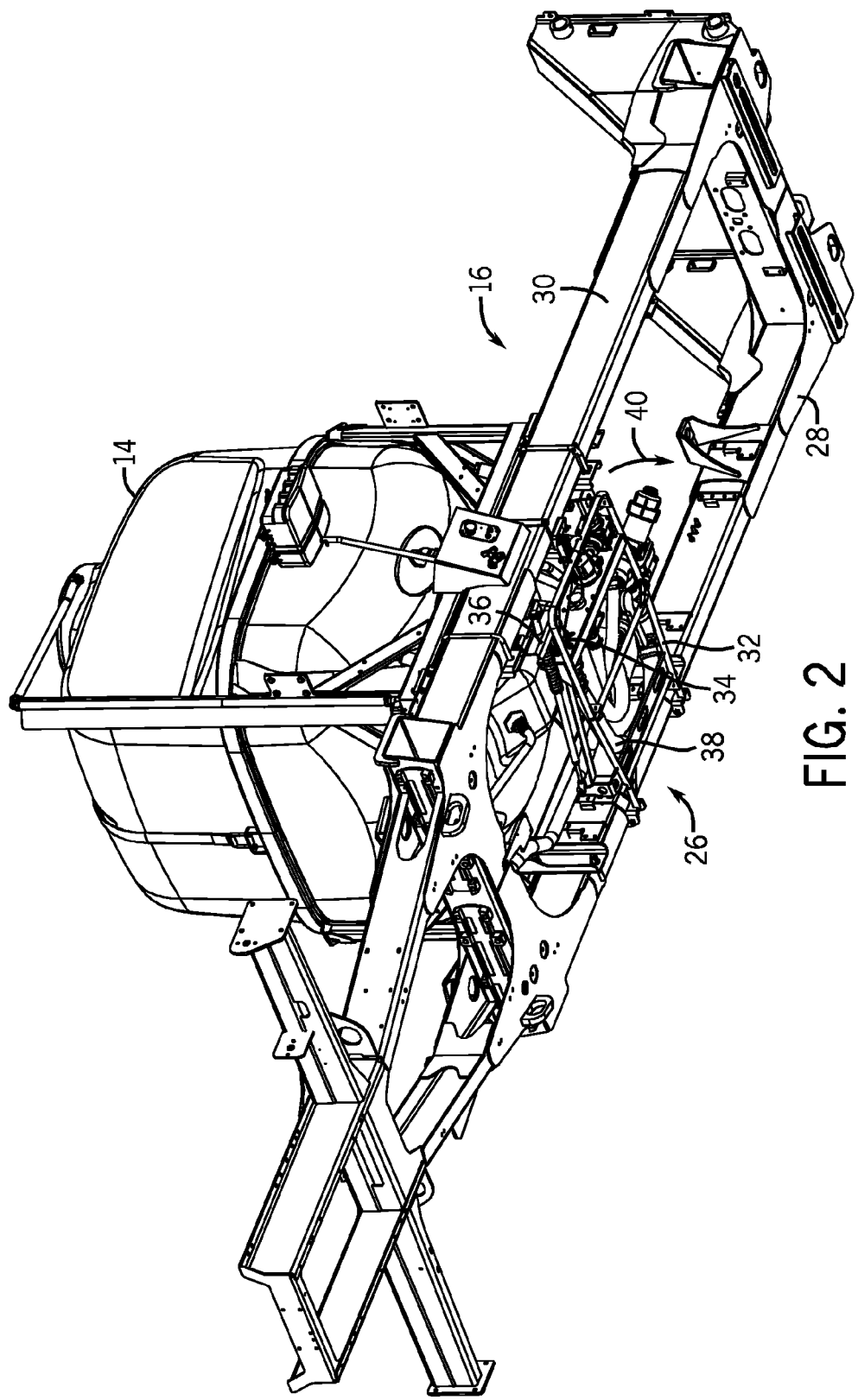
FIG. 2 is a perspective view of an embodiment of an operator interface assembly in a raised position relative to a vehicle chassis.

FIG. 2 is a perspective view of an embodiment of an operator interface assembly 26 in a raised position relative to a vehicle chassis 16. As illustrated, the vehicle chassis 16 includes a first frame tube 28 positioned on a first lateral side of the chassis 16, and a second frame tube 30 positioned on an opposite lateral side of the chassis 16. The frame tubes 28 and 30 are configured to support the tank 14, and other structural members of the vehicle chassis 16. In the illustrated embodiment, the operator interface assembly 26 includes a frame 32 having a first end rotatably coupled to the first frame tube 28, and a second end configured to transition between a raised position adjacent to the second lateral frame tube 30 and a lowered position beneath the second lateral frame tube 30 via rotation of the frame about the first end. In addition, the operator interface assembly 26 includes a fluid inlet 34 coupled to the frame 32, and configured to provide fluid to the tank 14. The operator interface assembly 26 also includes a valve 36 coupled to the frame 32, and configured to control fluid flow from the fluid inlet 34 to the tank 14. In the illustrated embodiment, the fluid inlet 34, the valve 36 and other components of the operator interface assembly 26 are coupled to various elements of the agricultural vehicle 10 (e.g., the tank 14, pumps, nozzles, etc.) via flexible hoses 38. The hoses 38 facilitate movement of the fluid inlet 34 and valve 36 relative to the chassis 16 while maintaining a fluid connection with the various elements of the agricultural vehicle.

As discussed in detail below, the operator interface frame 32 is configured to rotate in a direction 40 toward a lowered position. While in the lowered position, the fluid inlet 34 and the valve 36 are accessible by an operator positioned laterally outward from the agricultural vehicle 10. Consequently, the operator may fill the tank 14 with product by coupling a supply line to the fluid inlet 34, opening the valve 36 to establish a flow path between the fluid inlet 34 and the tank 14, and then initiating product flow through the supply line. After the tank 14 is filled to a desired level, the operator may rotate the frame 32 to the illustrated raised position. With the frame 32 in the raised position, the fluid inlet 34 and the valve 36 are positioned between the frame tubes 28 and 30, thereby substantially reducing or eliminating the possibility of crop contact as the vehicle 10 traverses a field. Consequently, the deployable operator interface facilitates operator access to the fluid inlet 34 and the valve 36, while enabling the vehicle to maintain the desired ground clearance.

Figure 3:
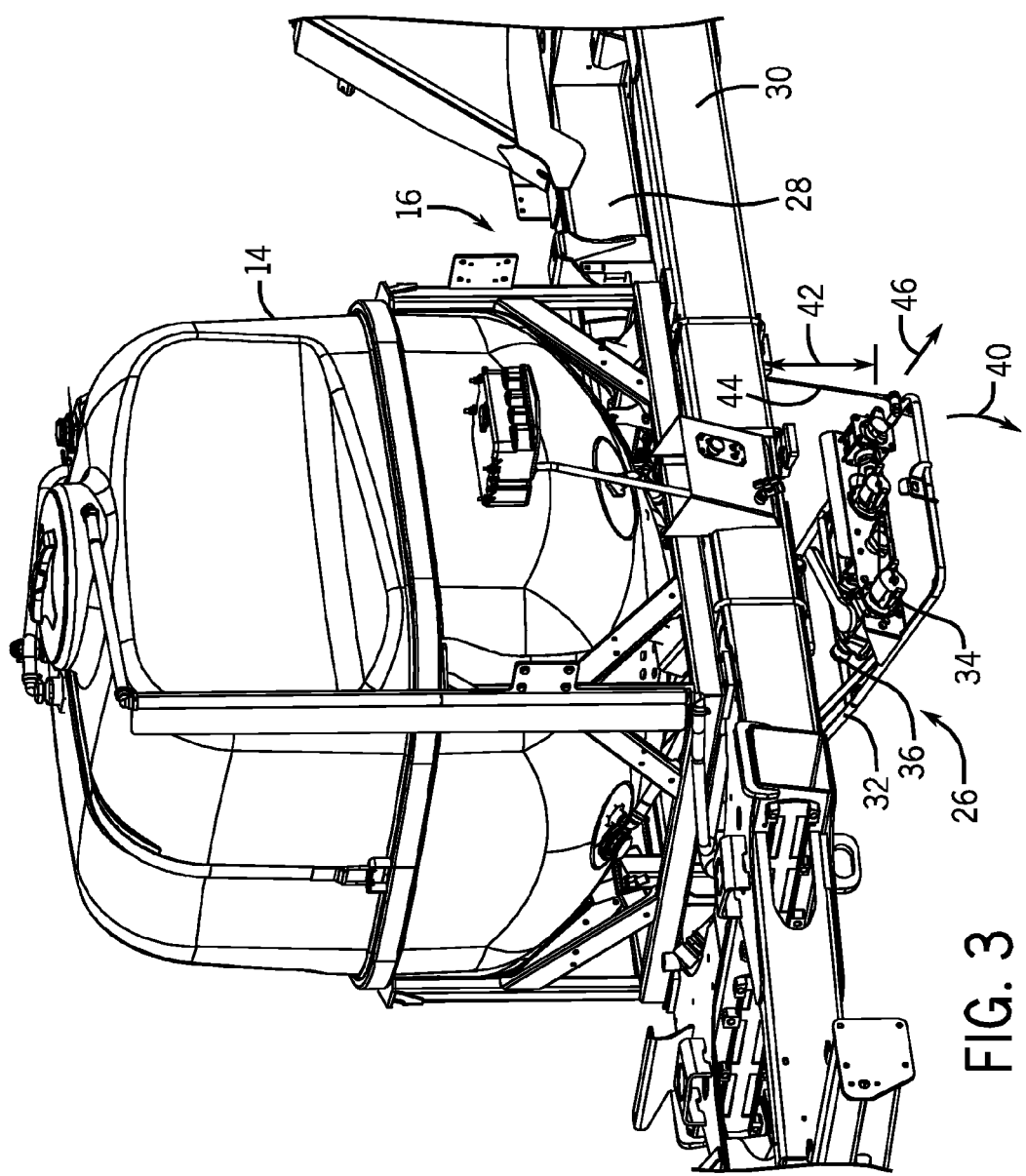
FIG. 3 is a perspective view of the operator interface assembly of FIG. 2 in a lowered position relative to the vehicle chassis.

FIG. 3 is a perspective view of the operator interface assembly 26 of FIG. 2 in a lowered position relative to the vehicle chassis 16. While the frame 32 is in the lowered position, the fluid inlet 34 and the valve 36 are positioned a distance 42 below the second frame tube 30. For example, the distance 42 may be greater than about 5, 10, 12, 15, 17, 20, 22, 25, or 30 inches, or more. In certain embodiments, the distance 42 may be between about 5 to about 30 inches, between about 10 to about 20 inches, or about 15 inches. By way of example, the chassis 16 may be positioned about 72 inches above the surface of the field, and the operator interface assembly 26 may be configured to position the fluid inlet 34 and the valve 36 about 24 inches below the second frame tube 30. Consequently, the fluid inlet 34 and the valve 36 will be positioned about 48 inches above the soil surface while the frame 32 is in the lowered position. As a result, access to the fluid inlet 34 and the valve 36 will be substantially enhanced.

In the illustrated embodiment, the operator interface assembly 26 includes a cable 44 extending between the second frame tube 30 and the operator interface frame 32. The cable 44 is configured to block rotation of the frame 32 in the direction 40 while the operator interface assembly 26 is in the lowered position. As will be appreciated, a length of the cable 44 may be particularly selected to achieve the desired distance 42. For example, a longer cable 44 will enable additional rotation of the frame 32, thereby lowering the position of the fluid inlet 34 and the valve 36 relative to the soil surface. Because the frame 32 extends across the width of the chassis 16, the fluid inlet 34 and the valve 36 will remain closer to a horizontal orientation than fluid inlets/valves coupled to shorter chassis. As a result, the operator will have enhanced access to the fluid inlet 34 and valve 36.

In the illustrated embodiment, the fluid inlet 34 and the valve 36 are positioned adjacent to the lateral end of the frame 32, and directed laterally outward in a direction 46. Consequently, the fluid inlet 34 and the valve 36 will be accessible by an operator positioned laterally outward from the agricultural vehicle 10 when the frame 32 is in the lowered position. In contrast, if the frame were positioned laterally inward from the frame tubes, access to the fluid inlet and valve may only be available from beneath the chassis. By positioning the fluid inlet 34 and the valve 36 on a laterally outward side of the frame 32 adjacent to the second frame tube 30, the operator will be able to access the interface assembly 26 from a standing position adjacent to the vehicle 10. As a result, the illustrated embodiment provides enhanced access to the fluid inlet 34 and the valve 36, as compared to configurations in which the operator interface frame is positioned laterally inward from the frame tubes.

Figure 4:
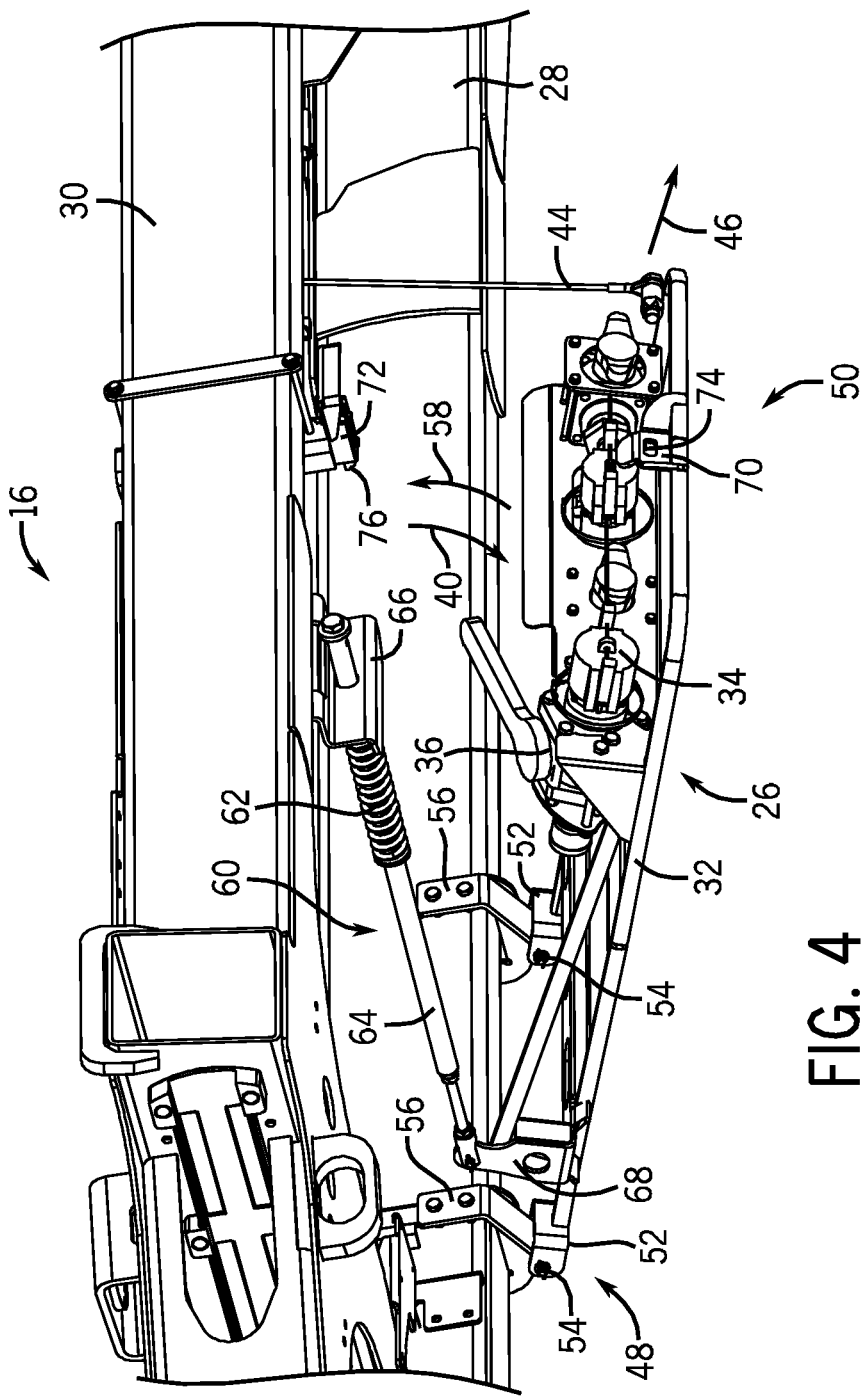
FIG. 4 is a detailed perspective view of the operator interface assembly of FIG. 2 in the lowered position relative to the chassis.

FIG. 4 is a detailed perspective view of the operator interface assembly 26 of FIG. 2 in the lowered position relative to the chassis 16. As previously discussed, the frame 32 includes a first end 48 rotatably coupled to the first lateral frame tube 28, and a second end 50 configured to transition between a raised position adjacent to the second lateral frame tube 30 and a lowered position beneath the second lateral frame tube 30 via rotation of the frame about the first end 48. To facilitate rotation, the frame 32 includes supports 52 coupled to the first end 48 of the frame 32. As illustrated, the supports 52 interface with respect pins 54 coupled to the first lateral frame tube 28 via mounts 56. In this configuration, the frame 32 may rotate in a direction 58 from the illustrated lowered position to a raised position, and in the direction 40 from the raised position to the lowered position.

In the illustrated embodiment, the operator interface assembly 26 includes a biasing assembly 60 configured to urge the second end 50 of the frame 32 toward the raised position. As illustrated, the biasing assembly 60 includes a compression spring 62 and a rod 64. The spring 62 extends between the rod 64 and a mounting plate 66 coupled to the second lateral frame tube 30. The rod 64, in turn, is coupled to a mount 68 positioned adjacent to the first end 48 of the frame 32. In this configuration, rotating the frame 32 in the direction 40 induces the rod 64 to pass through an opening in the mounting plate 66, thereby compressing the spring 62. As a result, the spring 62 urges the rod 64 to extend, thereby applying a torque to the frame 32 in the direction 58. Consequently, the biasing assembly 60 offsets at least a portion of the weight of the operator interface assembly 26, thereby reducing the effort associated with transitioning the frame to the raised position. While the illustrated biasing assembly utilizes a spring to urge the frame toward the raised position, it should be appreciated that alternative embodiments may employ pneumatic and/or hydraulic cylinders to establish the desired bias. In addition, certain embodiments may utilize a pneumatic cylinder, a hydraulic cylinder and/or an electromechanical actuator to automatically transition the frame between the raised and lowered positions based on operator input.

In the illustrated embodiment, the operator interface assembly 26 also includes a latching assembly configured to selectively hold the second end 50 in the raised position. As illustrated, a latch plate 70 is coupled to the second end 50 of the frame 32, and configured to selectively engage a latching mechanism 72 coupled to the second lateral frame tube 30. The latch plate 70 includes an opening 74 configured to interface with a protrusion 76 of the latching mechanism 72. The latch plate 70 and the protrusion 76 include respective curved surfaces configured to urge the protrusion 76 toward a retracted position as rotation of the frame in the direction 58 induces contact between the latch plate 70 and the protrusion 76. When the frame is in the raised position, the protrusion 76 will engage the opening 70, thereby holding the frame in the raised position. To transition the frame to the lowered position, an operator may disengage the latching mechanism 72, thereby extracting the protrusion 76 from the opening 74, and enabling rotation of the frame 32.

While the second end 50 is in the lowered position, the fluid inlet 34 and the valve 36 are accessible by an operator positioned laterally outward from the agricultural vehicle 10. For example, the fluid inlet 34 and the valve 36 may be positioned about 48 inches above the soil surface, thereby facilitating operator access. Consequently, the operator may fill the tank 14 with product by coupling a supply line to the fluid inlet 34, opening the valve 36 to establish a flow path between the fluid inlet 34 and the tank 14, and then initiating product flow through the supply line. After the tank 14 is filled to a desired level, the operator may rotate the frame 32 to the raised position, e.g., about 72 inches above the soil surface. In the raised position, the possibility of contact between the operator interface assembly 26 and the crops may be substantially reduced or eliminated. Because the deployable operator interface is configured to transition between the lowered and raised positions, the operator interface facilitates operator access, while enabling the vehicle to maintain the desired ground clearance.

Figure 5:
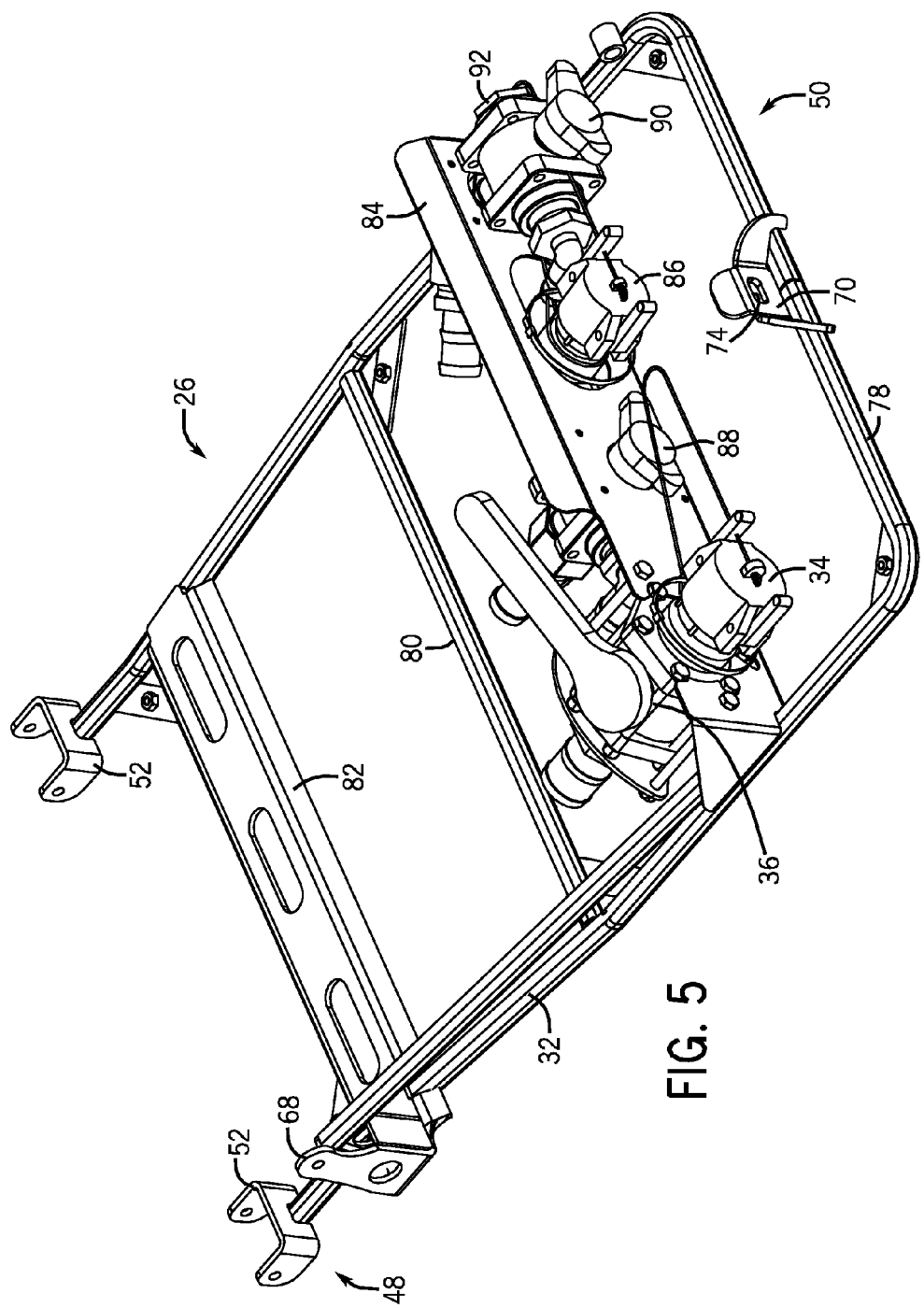
FIG. 5 is a perspective view of the operator interface assembly of FIG. 2.

FIG. 5 is a perspective view of the operator interface assembly 26 of FIG. 2. As illustrated, the frame 32 includes a U-shaped structural tube 78 extending between the supports 52. The frame 32 also includes a cross tube 80 and a support member 82 to provide additional structural rigidity to the frame 32. In addition, the frame 32 includes a mounting bracket 84 coupled to the structural tube 78, and configured to support the fluid inlet 34 and the valve 36. In the illustrated embodiment, the operator interface assembly 26 does not support a pump, or any other mechanical equipment configured to drive fluid from the inlet 34 to systems within the agricultural vehicle 10. Consequently, the frame 32 may be formed from lighter and/or fewer structural elements, thereby reducing the weight and complexity of the frame 32. In certain embodiments, the operator interface assembly 26 may include a crop shield positioned beneath the frame 32 to divert crops away from the fluid inlet 34 and the valve 36 as the vehicle 10 traverses a field.

In the illustrated embodiment, the fluid inlet 34 is configured to receive product from a supply line, and the valve 36 is configured to selectively facilitate product flow from the fluid inlet 34 to a flexible hose configured to deliver the product to the tank. In addition, the operator interface assembly 26 includes a second fluid inlet 86 configured to receive fresh water from a second supply line. In the illustrated embodiment, the inlet 86 is fluidly coupled to a three-way valve 88 configured to transition between a first position that establishes a fluid connection between the inlet 86 and a fresh water tank, a second position that establishes a fluid connection between the fresh water tank and the product delivery system, and a third position that blocks water flow through the valve 88. By way of example, to fill the fresh water tank, the operator may couple a water supply line to the second inlet 86, transition the valve 88 to the first position, and initiate water flow through the supply line. Once the fresh water tank is filled, the operator may transition the valve 88 to the second position to transfer water from the fresh water tank to the product tank 14. The illustrated operator interface assembly 26 also includes a second valve 90 configured to activate a recirculation rinse system configured to clean the product delivery system. In addition, the operator interface assembly 26 includes a dry product inlet 92 configured to receive dry product (e.g., fertilizer powder) from a storage container. In certain embodiments, the dry product may be mixed with water prior to being applied to the field.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An operator interface assembly, comprising:
a frame having a first end configured to rotatably couple to a first lateral frame tube of an agricultural vehicle, and a second end configured to transition between a raised position adjacent to a second lateral frame tube of the agricultural vehicle and a lowered position beneath the second lateral frame tube via rotation of the frame about the first end;
a fluid inlet coupled to the frame, and configured to provide fluid to the agricultural vehicle; and
a valve coupled to the frame, and configured to control fluid flow from the fluid inlet to the agricultural vehicle, wherein the fluid inlet and the valve are positioned adjacent to the second end of the frame, and directed laterally outward with respect to the agricultural vehicle.

2. The operator interface assembly of claim 1, wherein the operator interface assembly does not comprise a pump coupled to the frame.

3. The operator interface assembly of claim 1, wherein the fluid inlet and the valve are accessible by the frame positioned laterally outward from the agricultural vehicle when the second end is in the lowered position.

4. The operator interface assembly of claim 1, comprising a latch plate coupled to the second end of the frame, and configured to selectively engage a latching mechanism coupled to the second lateral frame tube of the agricultural vehicle to hold the second end in the raised position.

5. The operator interface assembly of claim 1, comprising a support coupled to the first end of the frame, wherein the support is configured to interface with a pin coupled to the first lateral frame tube of the agricultural vehicle to facilitate rotation of the frame about the first end.

6. The operator interface assembly of claim 1, wherein the lowered position is at least about 15 inches below the raised position.

7. The operator interface assembly of claim 1, comprising a biasing assembly configured to urge the second end toward the raised position.

8. The operator interface assembly of claim 1, comprising a cable configured to extend between the second end of the frame and the second lateral frame tube to block downward movement of the second end past the lowered position.

9. The operator interface assembly of claim 1, comprising a plurality of fluid inlets, wherein each fluid inlet is configured to receive at least one of liquid product, dry product and water.

10. The operator interface assembly of claim 1, comprising a flexible hose configured to fluidly couple the fluid inlet, the valve, or a combination thereof, to the agricultural vehicle.

11. An operator interface assembly, comprising:
a frame;
a support coupled to a first end of the frame, wherein the support is configured to interface with a pin coupled to a first lateral frame tube of an agricultural vehicle to facilitate rotation of the frame about the first end;
a latch plate coupled to a second end of the frame, and configured to selectively engage a latching mechanism coupled to a second lateral frame tube of the agricultural vehicle, wherein the latch plate is configured to hold the second end in a raised position while the latching mechanism is engaged, and to facilitate rotation of the second end to a lowered position when the latching mechanism is disengaged;
a fluid inlet coupled to the frame, and configured to provide fluid to the agricultural vehicle; and
a valve coupled to the frame, and configured to control fluid flow from the fluid inlet to the agricultural vehicle, wherein the fluid inlet and the valve are positioned adjacent to the second end of the frame, and directed laterally outward with respect to the agricultural vehicle.

12. The operator interface assembly of claim 11, wherein the operator interface assembly does not comprise a pump coupled to the frame.

13. The operator interface assembly of claim 11, wherein the fluid inlet and the valve are accessible by an operator positioned laterally outward from the agricultural vehicle when the second end is in the lowered position.

14. The operator interface assembly of claim 11, wherein the lowered position is at least about 15 inches below the raised position.

15. The operator interface assembly of claim 11, comprising a biasing assembly configured to urge the second end toward the raised position.

16. An operator interface assembly, comprising:
a frame having a first end configured to rotatably couple to an agricultural vehicle, and a second end configured to transition between a raised position adjacent to the agricultural vehicle and a lowered position beneath the agricultural vehicle via rotation of the frame about the first end;
a fluid inlet coupled to the frame, and configured to provide fluid to the agricultural vehicle; and
a valve coupled to the frame, and configured to control fluid flow from the fluid inlet to the agricultural vehicle, wherein the fluid inlet and the valve are positioned adjacent to the second end of the frame such that the fluid inlet and the valve are accessible by the frame positioned laterally outward from the agricultural vehicle when the second end is in the lowered position.

17. The operator interface assembly of claim 16, wherein the operator interface assembly does not comprise a pump coupled to the frame.

18. The operator interface assembly of claim 16, wherein the lowered position is at least about 15 inches below the raised position.

19. The operator interface assembly of claim 16, comprising a biasing assembly configured to urge the second end toward the raised position.

20. The operator interface assembly of claim 16, comprising a flexible hose configured to fluidly couple the fluid inlet, the valve, or a combination thereof, to the agricultural vehicle.

* * * * *